(No Model.) 2 Sheets—Sheet 1.

W. EDGE.
PROCESS OF MAKING SPIRALLY CORRUGATED SHEET METAL BODIES.

No. 496,601. Patented May 2, 1893.

WITNESSES:
Charles Schroeder.
Charles Bles.

INVENTOR
William Edge
BY
Hoepel & Raegener
ATTORNEYS.

(No Model.) 2 Sheets—Sheet 2.

W. EDGE.
PROCESS OF MAKING SPIRALLY CORRUGATED SHEET METAL BODIES.

No. 496,601. Patented May 2, 1893.

UNITED STATES PATENT OFFICE.

WILLIAM EDGE, OF BROOKLYN, NEW YORK.

PROCESS OF MAKING SPIRALLY-CORRUGATED SHEET-METAL BODIES.

SPECIFICATION forming part of Letters Patent No. 496,601, dated May 2, 1893.

Application filed November 16, 1891. Serial No. 412,012. (No model.)

*To all whom it may concern:*

Be it known that I, WILLIAM EDGE, a citizen of the United States, and a resident of Brooklyn, in the county of Kings and State of New York, have invented certain new and useful Improvements in Processes of Making Spirally-Corrugated Sheet-Metal Bodies, of which the following is a specification.

This invention relates to an improvement in a process of making spirally-corrugated sheet metal bodies, which are to be used for chandeliers, lamp-bodies, curtain pole ends, and other purposes; and the invention consists in an improved process of making spirally-corrugated sheet metal bodies by the following steps: First, subjecting the closed part of a cup-shaped blank to the action of spirally-corrugated dies; secondly, continuing the spiral corrugations over the cylindrical portion of the blank, and thirdly, closing the upper cylindrical portion of the spirally corrugated body.

Figure 1:
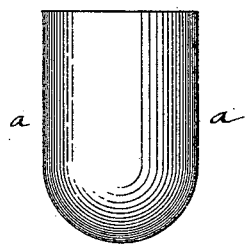
Figure 2:
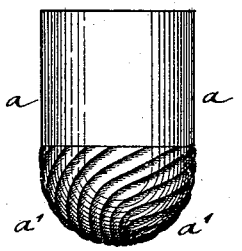
Figure 3:
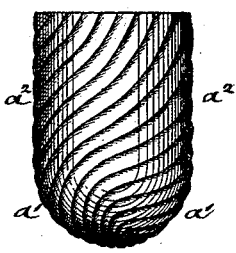
Figure 4:
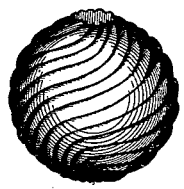
Figure 6:
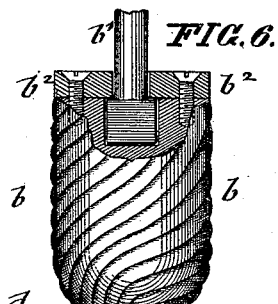
Figure 5:
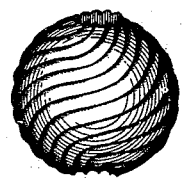
Figure 8:
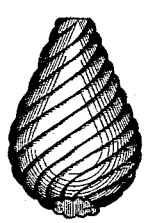
Figure 8:
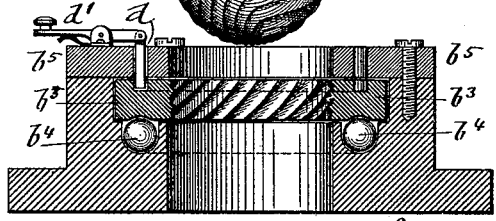
Figure 7:
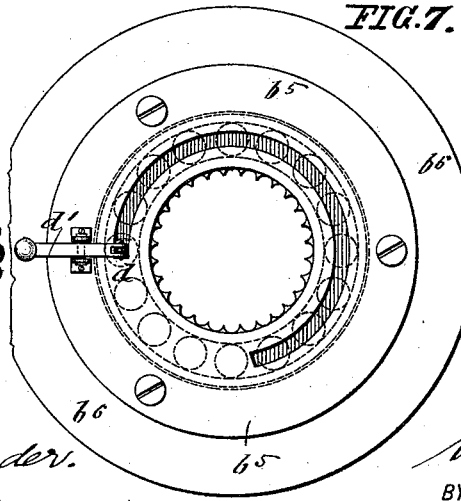
Figure 11:
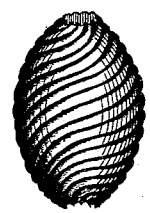
Figure 12:
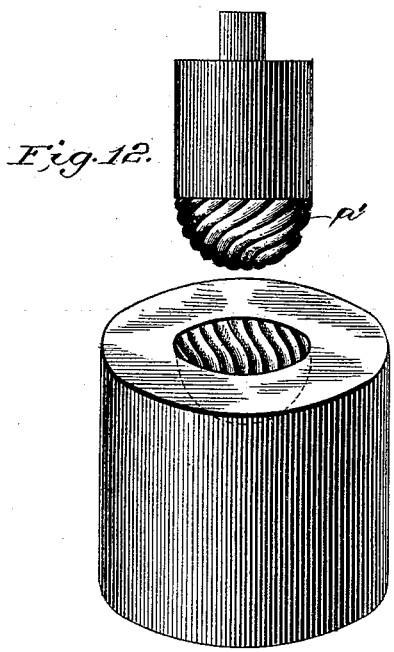
Figure 13:
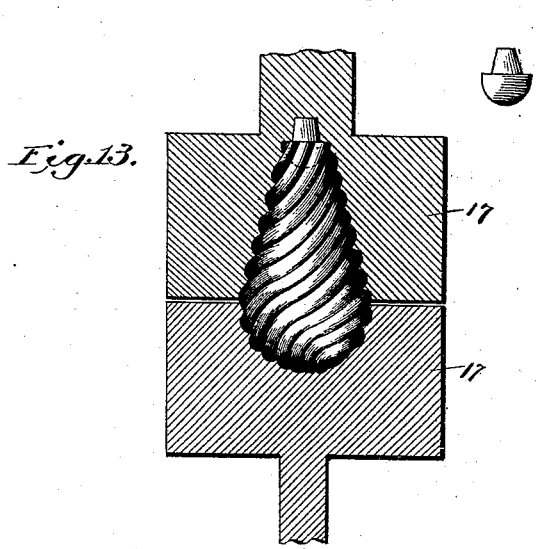
Figure 14:
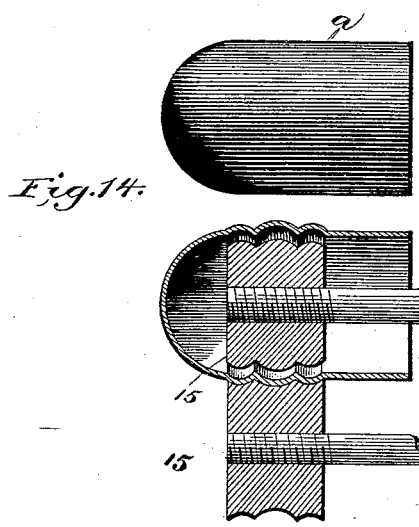
Figure 15:
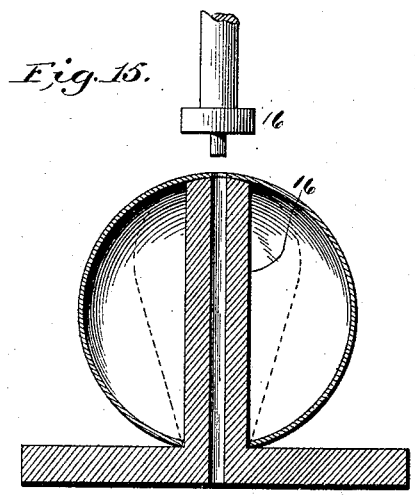

In the accompanying drawings the different steps of my improved process of making spirally-corrugated sheet metal bodies are illustrated, Figure 1 representing a side-view of a cup-shaped blank from which the spirally-corrugated bodies are made. Fig. 2 is a side-elevation of the blank, of which the closed part is corrugated. Fig. 3 is a side-view showing the continuations of the spiral corrugations along the cylindrical portion of the blank. Fig. 4 shows the cylindrical portion of the spirally-corrugated body compressed so as to be partly closed. Fig. 5 is a side-elevation of a spirally-corrugated body with openings in both ends, same in line with the top opening. Fig. 6 is a sectional side-elevation of the dies employed for imparting spiral corrugations to the cylindrical portion of the blank. Fig. 7 is a top-view of the lower portion of the die shown in Fig. 6; and Figs. 8, 9, 10 and 11 are different forms of spirally-corrugated bodies, made according to my improved process. Fig. 12 is a side elevation of the dies employed for imparting spiral corrugations to the bottom of the shell. Fig. 13 is a side elevation of the dies for making the cone shaped article, showing the plug inserted in the die, which serves as a stop for the shell. Fig. 14 shows a sectional side elevation of the dies for forming the strengthening ribs and also the blank. Fig. 15 is partly a sectional side elevation of the dies for punching the ends of the blanks, the view showing a brass ball and a cone shaped article in position to be punched.

Similar letters of reference indicate corresponding parts.

Figure 9:
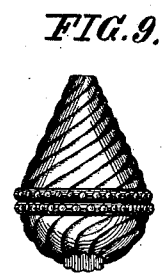
Figure 10:
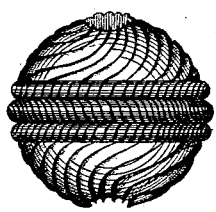

In carrying out my improved process of making spirally-corrugated sheet-metal bodies, a cup-shaped blank $a$ is made from sheet metal in the usual manner and the closed part of the same subjected to the action of dies of which the male part or punch is provided at its lower part with spiral flutes or ribs, while the female die is likewise provided with corresponding flutes or ribs so that when the male die enters the female die and pressure is exerted on the closed part of the blank spiral corrugations $a'$ are formed in the same, as shown in Fig. 2. The next step is to continue the spiral corrugations of the lower portion of the blank along the cylindrical portion of the same. This is accomplished by the dies shown in Fig. 6, in which the male die or punch $b$ is provided with spiral corrugations at its lower hemispherical portion and at its upper cylindrical portion and rigidly attached to a die-shank $b'$ by means of a cap $b^2$ that is screwed to the top of the punch as shown in Fig. 6. The spirally-corrugated or female part $b^3$ revolves on hardened steel-balls $b^4$ which are set in grooves of a die-holder that is formed of ring-shaped top and bottom plates $b^5$ $b^6$, the female part $b^3$ being rotated in one direction when the male die or punch $b$ enters the die-holder in its downward motion and in opposite direction when the male die $b$ is moved in upward direction on its return or withdrawal from the die-holder. The corrugated blank shown in Fig. 2 is placed on the male die or punch, shown in Fig. 6, which latter on descending, enters the female part $b^3$ so that the cylindrical part of the blank is spirally-corrugated in continuation of the spiral corrugations in its closed portion by the joint action of the male and female dies $b$ $b^3$ on the same. Simultaneously with the downward motion of the male die or punch $b$ an axial motion in one direction is imparted to the female die $b^3$ which follows easily the motion of the male die owing to the presence of the antifriction-balls on which it is supported in the die-holder. On withdrawing the punch $b$ from the female part or die $b^3$, the latter is turned in opposite direction, the blank being removed from the male die and dropped through the die-holder on the upward motion of the punch $b$. The axial motion of the female die $b^3$ in either direction is arrested by a stop-pin $d$, which is pivoted to a fulcrumed and spring-actuated lever $d'$, said stop-pin passing through a hole of the top-plate of the die-holder into a nearly circular recess of the female die $b^3$, as shown in Figs. 6 and 7, the length of the recess corresponding to the extent of axial motion required by the female die in producing the corrugations in the cylindrical portion of the blank. When the male die or punch $b$ is returned into its raised position, a new blank is placed on the same and corrugated by the descent of the punch and the action of the female die on the blank. The upper end of the spirally-corrugated blank is then squared off and closed more or less at the upper part by being placed between top and bottom dies of the required shape 17. If, however, the blank is desired to be made with one or more strengthening bands, as shown in Figs. 9 and 10, which serve also for ornamenting the body, the same is subjected to the action of rolling or expansion dies 15 so that annular beads or grooves extending around the middle portion of the sheet-metal body are produced. The so-ornamented spirally-grooved and drawn-in body can be used directly, while when an opening in each end is required, an opening in the opposite end is punched, which corresponds in size with the first opening, the punching action being accomplished in the usual manner by means of suitable punching dies 16.

It is obvious that a great many different kinds of shapes of sheet metal bodies can be made by the process heretofore described, such as ball-shaped, oval, pear-shaped and other bodies, with or without strengthening bands or grooves, as desired.

Having thus described my invention, I claim as new and desire to secure by Letters Patent—

1. The improvement in the art of making spirally-corrugated sheet-metal bodies, which consists in subjecting the closed part of a cup-shaped blank to the action of dies by which spiral corrugations are imparted to the same; secondly, subjecting the cylindrical portion of the blank to the action of dies so as to continue the corrugations over the cylindrical portion of the blank; and thirdly, reducing the open end of the cylindrical portion of the blank by suitable compressing dies, substantially as set forth.

2. The improvement in the art of making spirally-corrugated sheet-metal bodies, which consists in the following steps: first, subjecting the closed part of a cup-shaped blank to the action of dies by which spiral corrugations are imparted to the same; secondly, continuing the spiral corrugations in the cylindrical portion of the blank; thirdly, reducing the size of the open end of the cylindrical part of the blank by suitable compressing dies; and lastly, punching an opening in line with the partly closed end through the opposite end of the sheet-metal body, substantially as set forth.

3. The improvement in the art of making spirally-corrugated sheet-metal bodies, which consists in subjecting the closed part of a cup-shaped blank to the action of dies so as to produce spiral corrugations in the same; secondly, continuing said spiral corrugations over the cylindrical portion of the blank; thirdly, rolling one or more strengthening bands around the middle portion of the blank; and fourthly, reducing the size of the upper end of the blank by means of compressing dies, substantially as set forth.

In testimony that I claim the foregoing as my invention I have signed my name in presence of two subscribing witnesses.

WILLIAM EDGE.

Witnesses:
PAUL GOEPEL,
CHARLES SCHROEDER.